(12) United States Patent
Hoshino

(10) Patent No.: US 12,476,049 B2
(45) Date of Patent: Nov. 18, 2025

(54) ELECTRONIC COMPONENT AND METHOD FOR MANUFACTURING THE SAME

(71) Applicant: Murata Manufacturing Co., Ltd., Nagaokakyo (JP)

(72) Inventor: Yuuta Hoshino, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 152 days.

(21) Appl. No.: 18/362,108

(22) Filed: Jul. 31, 2023

(65) Prior Publication Data

US 2023/0377800 A1 Nov. 23, 2023

Related U.S. Application Data

(63) Continuation of application No. PCT/JP2022/007002, filed on Feb. 21, 2022.

(30) Foreign Application Priority Data

Mar. 26, 2021 (JP) .................................. 2021-054076

(51) Int. Cl.
| | |
|---|---|
| *H01G 4/248* | (2006.01) |
| *H01F 17/00* | (2006.01) |
| *H01G 4/008* | (2006.01) |
| *H01G 4/30* | (2006.01) |

(52) U.S. Cl.
CPC ......... *H01G 4/248* (2013.01); *H01F 17/0013* (2013.01); *H01G 4/0085* (2013.01); *H01G 4/30* (2013.01)

(58) Field of Classification Search
CPC ........ H01G 4/248; H01G 4/0085; H01G 4/30; H01F 17/0013
See application file for complete search history.

(56) References Cited

U.S. PATENT DOCUMENTS

| | | | |
|---|---|---|---|
| 2001/0017420 A1 | 8/2001 | Iwao et al. | |
| 2010/0328843 A1* | 12/2010 | Saruban | H01G 4/2325 427/126.2 |
| 2013/0120898 A1 | 5/2013 | Park et al. | |
| 2015/0016018 A1* | 1/2015 | Onishi | H10N 30/872 310/365 |

(Continued)

FOREIGN PATENT DOCUMENTS

| | | |
|---|---|---|
| JP | H06215981 A | 8/1994 |
| JP | 2001244116 A | 9/2001 |

(Continued)

OTHER PUBLICATIONS

International Search Report in PCT/JP2022/007002, mailed May 10, 2022, 3 pages.

*Primary Examiner* — Michael P McFadden
(74) *Attorney, Agent, or Firm* — ArentFox Schiff LLP

(57) ABSTRACT

An electronic component that includes a ceramic body and an external electrode on a surface of the ceramic body. The external electrode includes a base layer in contact with the surface of the ceramic body; and a metal layer on a surface of the base layer, the base layer having a pore communicating from the surface of the base layer to an interface with the surface of the ceramic body, a part of the metal layer extends to the interface with the surface of the ceramic body through the pore, and a void ratio in the base layer is 1.5 vol % or less.

9 Claims, 9 Drawing Sheets

(56) References Cited

U.S. PATENT DOCUMENTS

| | | | |
|---|---|---|---|
| 2016/0095223 A1* | 3/2016 | Yoshida | H01G 4/012 |
| | | | 361/301.4 |
| 2018/0061576 A1 | 3/2018 | Nakamura et al. | |
| 2018/0068788 A1 | 3/2018 | Kobayashi | |
| 2018/0090274 A1 | 3/2018 | Ito et al. | |
| 2018/0108481 A1* | 4/2018 | Tomizawa | H01G 4/2325 |
| 2020/0411247 A1* | 12/2020 | Saruban | H01G 4/12 |
| 2022/0189696 A1* | 6/2022 | Yi | H01G 4/232 |
| 2022/0208473 A1* | 6/2022 | Yun | H01G 4/232 |
| 2022/0293343 A1* | 9/2022 | Iguchi | H01G 4/302 |

FOREIGN PATENT DOCUMENTS

| | | |
|---|---|---|
| JP | 2013106035 A | 5/2013 |
| JP | 2018032788 A | 3/2018 |
| JP | 2018157183 A | 10/2018 |
| WO | 2016186053 A1 | 11/2016 |

\* cited by examiner

ELECTRONIC COMPONENT AND METHOD FOR MANUFACTURING THE SAME

CROSS REFERENCE TO RELATED APPLICATIONS

The present application is a continuation of International application No. PCT/JP2022/007002, filed Feb. 21, 2022, which claims priority to Japanese Patent Application No. 2021-054076, filed Mar. 26, 2021, the entire contents of each of which are incorporated herein by reference.

TECHNICAL FIELD

The present invention relates to an electronic component and a method for manufacturing the same, more particularly to an electronic component including a ceramic body and an external electrode provided on a surface of the ceramic body and a method for manufacturing the same.

BACKGROUND ART

An electronic component may include an external electrode for mounting on a circuit board or the like. In a general electronic component in the related art, an external electrode is formed by applying a conductive paste onto a ceramic body and firing the conductive paste to form a base layer derived from the conductive paste, and plating the base layer.

The external electrode of a multilayer chip inductor is made of a porous member having a large number of pores. For example, Patent Document 1 discloses that the porosity (void content) of the external electrode is desirably about 10% to 30%, and the average pore size of the pores is desirably 0.3 μm to 4.0 μm. The pores are impregnated with a resin of the same substance as a buffer interposed between a sintered body and an internal electrode. A plating layer is formed on a surface layer of the external electrode.

The external electrode is formed by firing and is formed of a material having such a composition that a large number of pores are generated after firing. For example, it is described that by using a metal paste containing Ag as a main component and containing 73 wt % of Ag particles (spherical particles, average particle diameter: 0.5 μm), 4 wt % of glass frit (ZnO—$B_2O_3$—$SiO_2$), 10 wt % of ethyl cellulose, and 13 wt % of a 1:1 mixed solution of butyl carbitol acetate and ethyl carbitol, the glass frit is gasified during firing to form a porous metal member.

Patent Document 1: Japanese Patent Application Laid-Open No. 2001-244116

SUMMARY OF THE INVENTION

In Patent Document 1, the bonding force between a porous external electrode (base layer) and a plating layer (metal layer) is not sufficient, and particularly when the electronic component is downsized, the metal layer may be peeled off.

An object of the present invention is therefore to provide an electronic component including a ceramic body and an external electrode, wherein the external electrode includes a base layer and a metal layer, and adhesion between the base layer and the metal layer is excellent, and a method for manufacturing the same.

One gist of the present invention provides an electronic component including a ceramic body and an external electrode on a surface of the ceramic body. The external electrode includes a base layer in contact with the surface of the ceramic body; and a metal layer on a surface of the base layer, the base layer having a pore communicating from the surface of the base layer to an interface with the surface of the ceramic body, a part of the metal layer extends to the interface with the surface of the ceramic body through the pore, and a void ratio in the base layer is 1.5 vol % or less.

Another gist of the present invention provides a method for manufacturing an electronic component, the method including: applying a raw material composition to a surface of a ceramic body, the raw material composition containing a glass precursor, a metal salt, an organic polymer as a thickener, and a solvent having a vapor pressure of 0.1 kPa or more at room temperature; performing a heat treatment to form a base layer for an external electrode in contact with the surface of the ceramic body, the base layer including an underlying metal and a glass; and forming a metal layer for the external electrode on a surface of the base layer by electrolytic plating.

The present invention provides an electronic component including a ceramic body and an external electrode, wherein the external electrode includes a base layer and a metal layer, and adhesion between the base layer and the metal layer is excellent. The present invention also provides a method for manufacturing such an electronic component.

DETAILED DESCRIPTION OF THE INVENTION

An electronic component of the present embodiment includes a ceramic body and an external electrode on a surface of the ceramic body, wherein the external electrode includes a base layer in contact with the surface of the ceramic body and a metal layer on a surface of the base layer, the base layer has a pore communicating from the surface to an interface with the ceramic body, a part of the metal layer extends to the interface through the pore, and a void in the base layer is 1.5 vol % or less.

As long as the electronic component includes a ceramic body and an external electrode on the surface of the ceramic body, the shape, dimensions, and material of the ceramic body, and the number, arrangement, shape, and the like of the external electrode are not particularly limited. The ceramic body may or may not have an internal electrode buried therein, and if present, the internal electrode is electrically connected to the external electrode in an appropriate manner.

The electronic component usable in the present embodiment may be, for example, a surface mounting type, particularly, a chip component, and more specifically, may be a capacitor such as a multilayer ceramic capacitor, an inductor (coil) such as a wound inductor, a film inductor, and a multilayer inductor, a resistor such as a chip resistor, a transistor, an LC composite component, or the like.

Figure 1A:
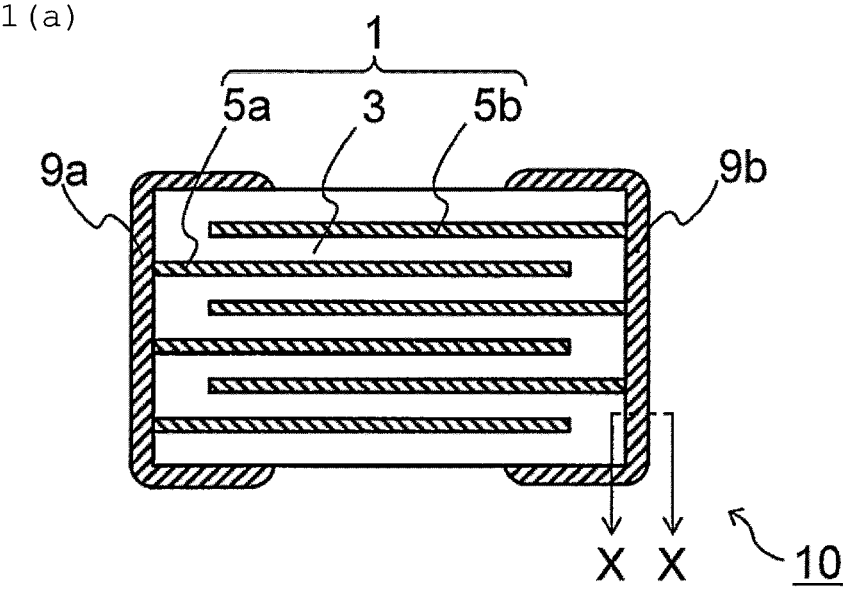
FIG. 1(a) is a schematic sectional view schematically illustrating an exemplary electronic component according to an embodiment of the present invention.

Exemplarily, an electronic component 10 of the present embodiment can be a multilayer ceramic capacitor as illustrated in FIG. 1(a) and includes a ceramic body 1 including a ceramic portion 3 made of a ceramic material and internal electrodes 5a and 5b opposed to each other with the ceramic portion 3 interposed therebetween, and external electrodes 9a and 9b provided on surfaces of the ceramic body 1 and electrically connected to the internal electrodes 5a and 5b, respectively. More specifically, the internal electrodes 5a and 5b are embedded in the ceramic body 1, stacked so as to be alternately exposed from opposing end surfaces of the ceramic body 1, and electrically connected to the external electrodes 9a and 9b, respectively. However, the electronic component 10 of the present embodiment is not limited to the one illustrated in FIG. 1(a) but may be various electronic components as described above.

Figure 1B:
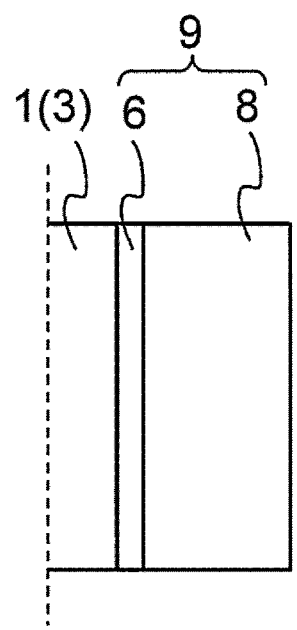
FIG. 1(b) is an enlarged schematic sectional view taken along the X-X plane of FIG. 1(a).

In the electronic component 10 of the present embodiment, as illustrated in FIG. 1(b), the external electrode 9 (corresponding to the external electrodes 9a and 9b exemplified in FIG. 1(a)) includes a base layer 6 in contact with the surface of the ceramic body 1 (mainly corresponding to the ceramic portion 3 exemplified in FIG. 1(a)), and a metal layer 8 formed on the base layer 6. In the ceramic body 1 including the internal electrodes 5a and 5b shown in FIG. 1(a), the base layer 6 can be formed so as to be in contact with the internal electrode 5a or 5b exposed on the end surface of ceramic body 1, and the metal layer 8 can be formed on the base layer 6.

The material constituting the metal layer 8 is not particularly limited as long as it is conductive, and examples thereof include nickel (Ni), copper (Cu), and tin (Sn). The metal layer 8 may be a single layer or a multilayer. The thickness of the metal layer 8 is not particularly limited but may be, for example, 100 nm to 10 μm.

Although the present embodiment is not limited, more specifically, the metal layer 8 may include a single nickel layer (Ni layer) in contact with the surface of the base layer 6.

When the metal layer 8 is a multilayer, a nickel layer can be included as an innermost layer (a layer in contact with the surface of the ceramic body 1). For example, the multilayer metal layer 8 may be a laminate (Ni/Cu/Sn layer) including a nickel layer (Ni layer), a copper layer (Cu layer), and a tin layer (Sn layer) in this order from the base layer 6.

The nickel layer can effectively prevent "solder leaching" in which the metal material contained in the base layer 6 is lost when the electronic component is soldered and mounted on a circuit board or the like (more specifically, a land or the like). The tin layer can constitute the outermost layer of the external electrode 9, and thereby "solder wettability" is improved when the electronic component is mounted on a circuit board or the like by soldering, and high strength can be obtained at a solder joint. The copper layer can be appropriately provided according to the application of the electronic component.

Figure 2:
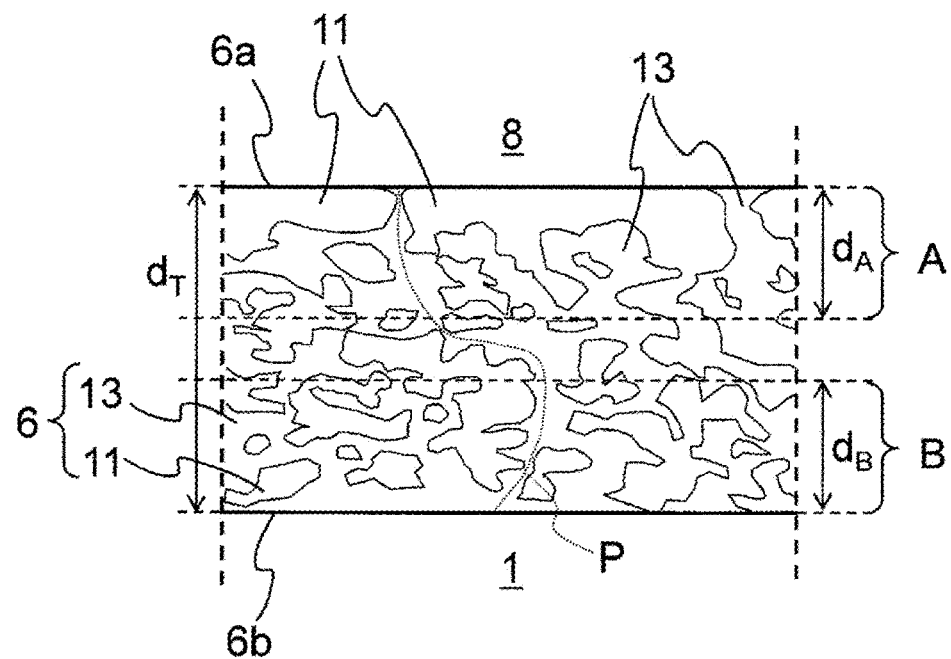
FIG. 2 is an enlarged schematic sectional view schematically illustrating a base layer of the electronic component and the vicinity thereof according to the embodiment of the present invention.

As shown in FIG. 2, the base layer 6 has a pore P communicating from a front surface 6a thereof to an interface (back surface 6b) with the ceramic body 1. Although FIG. 2 illustrates the pore P communicating from the front surface 6a to the back surface 6b in a planar (two-dimensional) manner, actually, a large number of pores P exist in a three-dimensional manner inside the base layer 6, and most of the pores P communicate from the front surface 6a to the back surface 6b. Therefore, it is difficult to directly observe the communicating pores by image analysis. After the metal layer 8 is formed, the base layer 6 is subjected to EDX analysis, and when an element (such as Ni) constituting the metal layer 8 is present inside the base layer 6, it can be presumed that pores P are present therein. When the metal layer 8 is formed on the front surface 6a of the base layer 6, a part of the metal layer 8 is also formed in the pores, so that most of the pores P do not remain as voids in the electronic component 10 as a final product.

A part of the metal layer 8 extends to the interface (back surface 6b) between the base layer 6 and the ceramic body 1 through the pores P of the base layer 6. As a result, since the metal layer 8 extends over the whole thickness of the base layer 6 like spreading roots of a tree, an anchor effect on the base layer 6 is high, and the metal layer 8 is hardly peeled off.

In the present embodiment, the void in the base layer 6 is as low as 1.5 vol % or less. In the present specification, the "void" means a space remaining after a part of the metal layer 8 spreads inside the pores P.

The low void ratio means that most of the pores P are filled with the metal layer 8. When most of the pores P are filled with the metal layer 8, the bonding strength between the base layer 6 and the metal layer 8 is further enhanced. That is, when the void ratio is as low as 1.5% or less, the bonding strength between the base layer 6 and the metal layer 8 can be increased.

The amount of voids (void ratio) can be determined by image analysis. The electronic component 10 is cut and sliced in the thickness direction of the base layer 6, and the position and direction of the sample are adjusted by TEM-EDX so that the interface between the ceramic body 1 and the base layer 6 and the interface between the base layer 6 and the metal layer 8 lie approximately in the horizontal direction on the observation screen, and then the image is enlarged so that most of the image is occupied by the base layer 6, a part of the metal layer 8 is shown on the front surface 6a side, and a part of the ceramic body 1 is shown on the back surface 6b side. Next, all elements (excluding carbon (C)) contained in the ceramic body 1, the base layer 6, and the metal layer 8 are detected by EDX analysis, and EDX images are combined to produce a composite map. Binarization image processing is performed using a threshold set such that a portion where no element is detected on the composite map is colored white, and an area Sw of a white portion included in the base layer 6 is determined.

On the same screen, the area of the whole base layer 6 is determined. On the screen, the thickness of the base layer 6 is visually confirmed, and three portions including a portion considered to be the thickest, a portion considered to be the thinnest, and a portion having an intermediate thickness are selected, and the thickness of the base layer 6 is measured at the position of each of the portions. The three measured values of the thickness are averaged to determine an average thickness Tave of the base layer 6.

On the same screen, a total length Ltotal of the base layer 6 in a direction orthogonal to the thickness measurement direction determined by visual observation is measured. A total area Stotal of the base layer 6 on the screen is determined by multiplying the average thickness Tave by the total length Ltotal of the base layer 6.

The void ratio is calculated by dividing the area Sw of the white portion by the total area Stotal of the base layer 6. That is, the void ratio can be determined by Equation (1) below.

$$\text{Void ratio (\%)} = Sw/(\text{Ltotal} \times \text{Tave}) \times 100 = Sw/\text{Stotal} \times 100 \quad (1)$$

Note that, in the case where it is difficult to set the threshold for binarization for determining the area Sw of the white portion, the EDX image may be visually recognized to identify the shape of the region where the element cannot be detected (displayed whitish), and the outline thereof may be traced by handwriting to calculate each area.

The base layer 6 is preferably 0.1 µm to 2 µm in thickness. When the thickness of the base layer 6 is in this range, the effect of improving the bonding strength between the metal layer 8 and the ceramic body 1 can be sufficiently exhibited, and a part of the metal layer 8 easily reaches the interface between the base layer 6 and the ceramic body 1 (the back surface 6b of the base layer 6) through the pores P of the base layer 6.

The thickness of the base layer 6 is preferably 0.1 µm to 1.7 µm, more preferably 0.1 µm to 1.3 µm.

Such a thin base layer 6 can be formed by using, for example, a sol-gel method.

A thickness $d_T$ of the base layer 6 (refer to FIG. 2) is understood as the distance between the ceramic body 1 and the metal layer 8. The thickness of the base layer 6 can be determined as a thickness measured in the central portion of the base layer using a sectional image obtained by exposing a section of the base layer 6 in the thickness direction and observing the exposed section and appropriately analyzing the exposed section as necessary. The sectional image may be a SEM image obtained using a scanning electron microscope (SEM), a SIM image obtained using a scanning ion microscope (SIM), a TEM image obtained using a transmission electron microscope (TEM), a SEM/SIM/TEM-EDX image obtained by combining any of these with energy dispersive X-ray analysis (EDX), or the like. The exposed section may be obtained by processing an electronic component with a focused ion beam (FIB).

In an appropriate sectional image, the thickness of the base layer 6 is visually confirmed, and three portions including a portion considered to be the thickest, a portion considered to be the thinnest, and a portion having an intermediate thickness are selected, and the thickness of the base layer 6 is measured at the position of each of the portions. The three measured values of the thickness are averaged to determine the average thickness of the base layer 6, which is defined as the thickness of the base layer 6 (corresponding to Tave described above).

The base layer 6 may contain an underlying metal and glass. In the base layer 6, the underlying metal and glass can be present as a glass region 13 and an underlying metal region 11 (see FIG. 2). In the sectional view (FIG. 2) of the base layer 6, when a portion A of the base layer 6 on the front surface 6a side (interface side in contact with the metal layer 8) is compared with a portion B of the base layer 6 on the back surface 6b side (interface side in contact with the ceramic body 1), the area of the underlying metal region 11 in the range of the portion A is preferably larger than the area of the underlying metal region 11 in the range of the portion B. When this is compared with the "volume ratio of the underlying metal to glass" (sometimes referred to as "underlying metal/glass ratio" in the present specification), the underlying metal/glass ratio in the portion A (the portion of the base layer 6 on the front surface 6a side) of the base layer 6 closer to the metal layer 8 is preferably higher than the underlying metal/glass ratio in the portion B (the portion of the base layer 6 on the back surface 6b side) of the base layer 6 closer to the ceramic body 1.

In the present specification, the "portion A of the base layer 6 closer to the metal layer 8" refers to a portion within a range defined by a thickness $d_A$ from the interface (the front surface 6a of the base layer 6) of the base layer 6 with the metal layer 8. The thickness $d_A$ can be appropriately set in a range of 50% or less of the thickness of the base layer 6, and typically, the thickness $d_A$ can be 30% of the thickness $d_T$ of the base layer 6.

The "portion B of the base layer 6 closer to the ceramic body 1" refers to a portion within a range defined by a thickness $d_B$ from the interface (the back surface 6b of the base layer 6) of the base layer 6 with the ceramic body 1. The thickness $d_B$ is a thickness equal to the thickness $d_A$ and can typically be 30% of the thickness $d_T$ of the base layer 6.

Since the underlying metal/glass ratio in the portion A of the base layer 6 is higher than the underlying metal/glass ratio in the portion B, the metal layer 8 having a high density can be formed.

When the metal layer 8 is formed by electrolytic plating, a plating layer is formed on the surface of a conductive material (that is, the underlying metal region 11 of the base layer 6). When the underlying metal region 11 is present in a large amount on the front surface 6a side of the base layer 6, a plating layer having a sufficient density and thickness can be formed on the front surface 6a of the base layer 6 when electrolytic plating is performed (effect of improving the amount of adhesion of plating).

Usually, when the base layer containing the underlying metal and glass is formed, a glass component tends to gather on the front surface side of the base layer (this may be referred to as "glass floats"), but the present embodiment is greatly different from the conventional art in that a metal component gathers on the front surface 6a side of the base layer 6.

In the present embodiment, by controlling the temperature of the heat treatment at the time of forming the base layer 6, the underlying metal/glass ratio of the base layer 6 can be increased in the portion A located on the front surface 6a side and decreased in the portion B located on the back surface 6b side. The mechanism by which the underlying metal/glass ratios can be made different in the thickness direction of the base layer 6 is not clear, but it is presumed that the balance between the sintered state of glass formed by the sol-gel method and the metallized state of the metal salt when the base layer 6 is formed, the wettability between glass and metal, and the like have effects.

The "volume ratio of the metal to the glass (underlying metal/glass ratio)" can be specified as follows.

The electronic component 10 is cut and sliced in the thickness direction of the external electrode 9, and the base layer 6 of the external electrode 9 is photographed at an arbitrary position by TEM-EDX. Subsequently, EDX images of the main component of glass (such as Si for silica glass) and the main component of the underlying metal (such as silver) are acquired.

Next, on the EDX image of the Si element, the thickness $d_T$ of the base layer 6 is divided into 10 equal regions in a range measuring 650 nm in width, and the regions are numbered from No. 1 to No. 10 from the front surface 6a side toward the back surface 6b side of the base layer 6. An image in a desired range from the front surface 6a side (3 regions of No. 1 to No. 3 when the thickness is 30% of the thickness $d_T$) is cut out. Binarization image processing is performed using a threshold set such that the case where the target element (Si) exists is indicated by the white color, and the areas of white portions included in the regions No. 1 to No. 3 are determined. Next, images of the same number of regions (3 regions No. 7 to No. 10) from the back surface 6b side are cut out, and binarization image processing is performed in the same manner to determine the areas of white portions included in the regions No. 7 to No. 10. These areas are proportional to the content of glass in each of the portion (the portion A of the base layer 6 closer to the metal layer 8) of the base layer 6 on the front surface 6a side and the portion (the portion B of the base layer 6 closer to the ceramic body 1) of the base layer 6 on the back surface 6b side.

Next, on the EDX image of the Ag element, the thickness $d_T$ of the base layer 6 is divided into 10 equal regions, and the regions are numbered from No. 1 to No. 10 from the front surface 6a side toward the back surface 6b side of the base layer 6. An image in a desired range (the range is set to the same range as for the image processing of the EDX image of the Si element. In this example, the range is 30% of the thickness $d_T$, that is, 3 regions No. 1 to No. 3) from the front surface 6a side is cut out. Binarization image processing is performed using a threshold set such that the case where the target element (Ag) exists is indicated by the white color, and the areas of white portions included in the regions No. 1 to No. 3 are determined. Next, images of the same number of regions (3 regions No. 7 to No. 10) from the back surface 6b side are cut out, and binarization image processing is performed in the same manner to determine the areas of white portions included in the regions No. 7 to No. 10. These areas are proportional to the content of the underlying metal in each of the portion (the portion A of the base layer 6 closer to the metal layer 8) of the base layer 6 on the front surface 6a side and the portion (the portion B of the base layer 6 closer to the ceramic body 1) of the base layer 6 on the back surface 6b side.

Note that, in the case where it is difficult to set the threshold for binarization, the EDX image may be visually recognized to identify the shapes of the underlying metal region 11 and the glass region 13, and the outlines thereof may be traced by handwriting to calculate each area.

Assuming that the area of Si and the area of Ag in the portion A on the front surface 6a side of the base layer 6 are S1 and A1, respectively, and the area of Si and the area of Ag in the portion B on the back surface 6b side of the base layer 6 are S2 and A2, respectively, the underlying metal/glass ratio is determined by Equations (2) and (3) below.

$$\text{"Volume ratio of underlying metal to glass in portion A of base layer 6 closer to metal layer 8", that is, underlying metal/glass ratio in portion A on front surface 6a side of base layer 6} = A1/S1 \quad (2)$$

$$\text{"Volume ratio of underlying metal to glass in portion B of base layer 6 closer to ceramic body 1", that is, underlying metal/glass ratio in portion B on back surface 6b side of base layer 6} = A2/S2 \quad (3)$$

When following formula (4) is satisfied, it can be confirmed that the underlying metal/glass ratio in the portion A is larger than the underlying metal/glass ratio in the portion B.

$$A1/S1 > A2/S2 \quad (4)$$

It is particularly preferable that the underlying metal/glass ratio in the portion A of the base layer 6 closer to the metal layer 8 (the front surface 6a side of the base layer 6) is 50% or more, and when electrolytic plating is performed for formation of the metal layer 8, a plating layer having a higher density can be formed on the front surface 6a of the base layer 6 (effect of improving the amount of adhesion of plating).

When the following formula (5) is satisfied, it can be confirmed that the underlying metal/glass ratio in the portion A is 50% (0.5) or more.

$$A1/S1 > 0.5 \quad (5)$$

Figure 3:
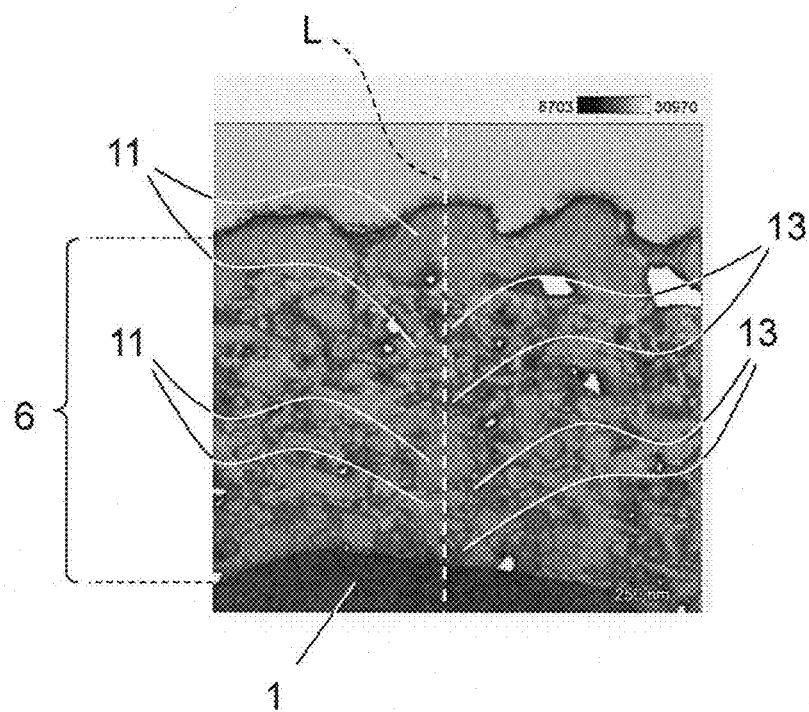
FIG. 3 is a TEM image of a section of the base layer in the state where the base layer is formed on a surface of a ceramic body (before plating treatment) in the embodiment of the present invention.

The base layer 6 includes the underlying metal region 11 made of the underlying metal and the glass region 13 made of glass, and it is preferable that at least two underlying metal regions 11 and at least two glass regions 13 be alternately arranged on a straight line L drawn along the thickness direction of the base layer 6 in a sectional view as illustrated in FIG. 3.

While the electronic component 10 is heated for solder reflow at the time of mounting, the base layer 6 may be cracked by thermal stress applied at that time. This is considered to be due to the thermal expansion coefficient of the ceramic body 1 and the thermal expansion of the glass constituting the matrix of the base layer 6. When the glass regions 13 and the underlying metal regions 11 are alternately arranged along the thickness direction of the base layer 6, concentration of stress due to thermal expansion in the glass region 13 can be alleviated, and as a result, formation of cracks during reflow can be suppressed.

The underlying metal is preferably silver. The underlying metal may be copper. The glass preferably contains silicon atoms, titanium atoms, and zirconium atoms. The metal layer preferably contains one or more selected from the group consisting of nickel, copper, and tin.

Manufacturing Method

The electronic component 10 of the present embodiment can be manufactured by, for example, the following method.

1) Preparation of Ceramic Body 1

First, the ceramic body 1 is prepared. The ceramic body 1 can be prepared by any suitable method.

For example, the ceramic material constituting the ceramic body 1 (more specifically, the ceramic portion 3) is not particularly limited as long as it is a ceramic material used for electronic components. Since the electronic component 10 exemplarily illustrated in FIG. 1(a) is a multilayer capacitor, the ceramic material is a dielectric material, and examples thereof include $BaTiO_3$, $CaTiO_3$, $SrTiO_3$, $CaZrO_3$, $(BaSr)TiO_3$, $Ba(ZrTi)O_3$, and $(BiZn)Nb_2O_7$. When present, the material constituting the internal electrodes 5a and 5b is not particularly limited as long as it is conductive, and examples thereof include Ag, Cu, Pt, Ni, Al, Pd, and Au. The material constituting the internal electrodes 5a and 5b is preferably Ag, Cu, and Ni.

The ceramic material used in the present embodiment is not limited to the above-described materials but can be appropriately selected according to the type, configuration, and the like of the electronic component. For example, when the electronic component is a ferrite coil component, the ceramic material may be a ferrite material containing Fe, Ni, Zn, Mn, Cu, or the like. In this case, the ceramic body may include a coil instead of the internal electrodes. As long as the coil is finally electrically connected to the external electrodes, for example, the coil may be embedded in the ceramic body in advance or wound around the ceramic body before or after the external electrodes are formed.

2) Formation of Base Layer 6

Next, the base layer 6 is formed in a predetermined region of the ceramic body 1 where the external electrode 9 is to be formed.

In the present embodiment, the base layer 6 can be formed by a thin film production method using a solution. As the thin film production method, the sol-gel method, the metal-organic decomposition (MOD) method, the chemical solution deposition (CSD) method, or the like can be used. Note that these methods are often treated synonymously. The term "sol-gel method" as used in the present specification is used to encompass the narrow sense of "sol-gel method", MOD, and CSD unless otherwise stated.

When the sol-gel method is used, it is easy to form a thin film having a thickness of 0.1 μm to 2.0 μm.

When the base layer 6 is formed by the sol-gel method, a raw material composition for forming the base layer 6 is prepared. The raw material composition may be a liquid material (paste) in which a raw material of the glass (precursor of glass), a raw material of the underlying metal (metal salt), and an organic polymer are dissolved or dispersed in a solvent.

Precursor of Glass

The precursor of glass is a glass raw material and may be any starting material that can produce a glass matrix (glass region 13). Examples of the precursor of glass include metal alkoxides, acetylacetonate complexes, and acetate salts. These raw materials may be modified with a functional group such as a long-chain alkyl group and an epoxy group. Compounds that can be used as the precursor of glass will be described below.

Metal Alkoxide

Examples of an element with which the metal alkoxide can be synthesized include Li, Be, B, C, Na, Mg, Al, Si, P, K, Ca, Sc, Ti, V, Cr, Mn, Fe, Co, Ni, Cu, Zn, Ga, Ge, As, Rb, Sr, Y, Zr, Nb, Mo, Cd, In, Sn, Sb, Cs, Ba, La, Ce, Pr, Nd, Pm, Sm, Eu, Gd, Tb, Dy, Ho, Er, Tm, Yb, Lu, Hf, Ta, W, Hg, Tl, Pb, Bi, Th, Pa, U, and Pu. Alkoxides of these elements can be utilized as precursors of glass.

Specific metal alkoxides that can be used as precursors of glass are exemplified below:

Metal alkoxides such as sodium methoxide, sodium ethoxide, calcium diethoxide, lithium isopropoxide, lithium ethoxide, lithium tert-butoxide, lithium methoxide, boron alkoxides, potassium t-butoxide, tetraethyl orthosilicate, allyltrimethoxysilane, isobutyl(trimethoxy)silane, tetrapropyl orthosilicate, tetramethyl orthosilicate, [3-(diethylamino)propyl]trimethoxysilane, triethoxy(octyl)silane, triethoxyvinylsilane, triethoxyphenylsilane, trimethoxyphenylsilane, trimethoxymethylsilane, butyltrichlorosilane, n-propyltriethoxysilane, methyltrichlorosilane, dimethoxy(methyl)octylsilane, dimethoxydimethylsilane, tris (tert-butoxy)silanol, tris(tert-pentoxy)silanol, hexadecyltrimethoxysilane, dipotassium tris(1,2-benzenediolato-O,O')silicate, tetrabutyl orthosilicate, aluminum silicate, calcium silicate, a tetramethylammonium silicate solution, chlorotriisopropoxytitanium (IV), titanium (IV) isopropoxide, titanium (IV) 2-ethylhexyl oxide, titanium (IV) ethoxide, titanium (IV) butoxide, titanium (IV) tert-butoxide, titanium (IV) propoxide, titanium (IV) methoxide, zirconium (IV) bis(diethyl citrato)dipropoxide, zirconium (IV) dibutoxide(bis-2,4-pentanedionate), zirconium (IV) 2-ethylhexanoate, the zirconium (IV) isopropoxide isopropanol complex, zirconium (IV) ethoxide, zirconium (IV) butoxide, zirconium (IV) tert-butoxide, zirconium (IV) propoxide, aluminum tert-butoxide, aluminum isopropoxide, aluminum ethoxide, aluminum-tri-sec-butoxide, and aluminum phenoxide.

Acetylacetonate Complex

Specific acetylacetonate complexes that can be used as precursors of glass are exemplified below:

Metal complexes of acetylacetonates such as lithium acetylacetonate, titanium (IV) oxyacetylacetonate, titanium diisopropoxide bis(acetylacetonate), zirconium (IV) trifluoroacetylacetonate, zirconium (IV) acetylacetonate, aluminum acetylacetonate, aluminum (III) acetylacetonate, calcium (II) acetylacetonate, and zinc (II) acetylacetonate.

Acetate Salt

Specific acetate salts that can be used as precursors of glass are exemplified below:

Acetate salts such as zirconium acetate, zirconium (IV) acetate hydroxide, and basic aluminum acetate.

Additive for Glass

The glass contained in the base layer 6 may contain additives as exemplified below (these are referred to as "additives for glass"). The additives may be mixed in the form of powder, microparticles, or nanoparticles.

Organic acid salts such as salts of oxoacids such as soda ash (sodium carbonate $Na_2CO_3$), sodium hydrogen carbonate ($NaHCO_3$), sodium percarbonate ($2Na_2CO_3 \cdot 3H_2O_2$), sodium sulfite ($Na_2SO_3$), sodium hydrogen sulfite ($NaHSO_3$), sodium sulfate ($Na_2SO_4$), sodium thiosulfate ($Na_2S_2O_3$), sodium nitrate ($NaNO_3$), and sodium sulfite ($NaNO_2$); halogen compounds such as sodium fluoride (NaF), sodium chloride (NaCl), sodium bromide (NaBr), and sodium iodide (NaI); oxides such as sodium peroxide ($Na_2O_2$) and sodium hydroxide (NaOH); inorganic salts such as hydroxides, sodium hydride (NaH), sodium sulfide ($Na_2S$), sodium hydrogen sulfide (NaHS), sodium silicate ($Na_2SiO_3$), trisodium phosphate ($Na_3PO_4$), sodium borate ($Na_3BO_3$), sodium borohydride ($NaBH_4$), sodium cyanide (NaCN), sodium cyanate (NaOCN), and sodium tetrachloroaurate ($Na[AuCl_4]$); sodium acetate ($CH_3COONa$); and sodium citrate.

Inorganic salts such as calcium peroxide ($CaO_2$), calcium hydroxide ($Ca(OH)_2$), calcium fluoride ($CaF_2$), calcium chloride ($CaCl_2 \cdot 2H_2O$), calcium bromide ($CaBr_2 \cdot 2H_2O$), calcium iodide ($CaI_2 \cdot 3H_2O$), calcium hydride ($CaH_2$), calcium carbide ($CaC_2$), and calcium phosphide ($Ca_3P_2$); oxoacid salts such as calcium carbonate ($CaCO_3$), calcium hydrogen carbonate ($Ca(HCO_3)_2$), calcium nitrate ($Ca(NO_3)_2 \cdot 4H_2O$), calcium sulfate ($CaSO_4 \cdot 2H_2O$), calcium sulfite ($CaSO_3$), calcium silicate ($CaSiO_3$ or $Ca_2SiO_4$), calcium phosphate ($Ca_3(PO_4)_2$), calcium pyrophosphate ($Ca_2O_7P_2$), calcium hypochlorite ($Ca[ClO]_2$), calcium chlorate ($Ca(ClO_3)_2$), calcium perchlorate ($Ca(ClO_4)_2$), calcium bromate ($Ca(BrO_2)_2$), calcium iodate ($Ca(IO_3)_2$, $H_2O$), calcium arsenite ($Ca_3(AsO_4)_2$), calcium chromate ($CaCrO_4$), calcium tungstate ($CaWO_4$), calcium molybdate ($CaMoO_4$), calcium magnesium carbonate ($CaMg(CO_3)_2$), and hydroxyapatite ($Ca_5(PO_4)_3(OH)$ or $Ca_{10}(PO_4)_6(OH)_2$); and organic salts such as calcium acetate ($Ca(CH_3COO)_2$), calcium gluconate ($C_{12}H_{22}CaO_{14}$), calcium citrate ($Ca_3(C_6H_5O_7)_2$), calcium malate ($Ca(C_2H_4O(COO)_2$), calcium lactate ($C_6H_{10}CaO_6$), calcium benzoate ($C_{14}H_{10}CaO_4$), calcium stearate ($Ca(C_{17}H_{35}COO)_2$), and calcium aspartate ($Ca(C_4H_6NO_4)_2$).

Lithium carbonate ($Li_2CO_3$), lithium chloride (LiCl), lithium titanate ($Li_2TiO_3$), lithium nitride ($Li_3N$), lithium peroxide ($Li_2O_2$), lithium citrate ($Li_3C_6H_5O_7$), lithium fluoride (LiF), lithium hexafluorophosphate ($LiPF_6$), lithium acetate ($C_2H_3LiO_2$), lithium iodide (LiI), lithium hypochlorite (ClLiO), lithium tetraborate ($Li_2B_4O_7$), lithium bromide (LiBr), lithium nitrate ($LiNO_3$), lithium hydroxide (LiOH), lithium aluminum hydride ($LiAlH_4$), lithium triethylborohydride ($Li(C_2H_5)_3BH$), lithium hydride (LiH), lithium amide ($LiNH_2$), lithium imide ($Li_2NH$), lithium diisopropylamide ($C_6H_{14}LiN$ or $LiN(C_3H_7)_2$), lithium tetramethylpiperidide ($C_9H_{18}LiN$), lithium sulfide ($Li_2S$), lithium sulfate ($Li_2SO_4$), lithium thiophenolate ($C_6H_5LiS$), and lithium phenoxide ($C_6H_5LiO$).

Boron triiodide ($BI_3$), sodium cyanoborohydride ($NaBH_3CN$), sodium borohydride ($NaBH_4$), tetrafluoroboric acid ($HBF_4$), triethylborane (($CH_3CH_2)_3B$), borax ($Na_2B_4O_5(OH)_4 \cdot 8H_2O$), and boric acid ($B(OH)_3$).

Potassium arsenide ($K_3As$), potassium bromide (KBr), potassium carbide ($K_2C_2$), potassium chloride (KCl), potassium fluoride (KF), potassium hydride (KH), potassium iodide (KI), potassium triiodide ($KI_3$), potassium azide ($KN_3$), potassium nitride ($K_3N$), potassium superoxide ($KO_2$), potassium ozonide ($KO_3$), potassium peroxide ($K_2O_2$), potassium phosphide ($K_3P$), potassium sulfide ($K_2S$), potassium selenide ($K_2Se$), potassium telluride ($K_2Te$), potassium tetrafluoroaluminate ($KAlF_4$), potassium tetrafluoroborate ($KBF_4$), potassium tetrahydroborate ($KBH_4$), potassium methanide ($KCH_3$), potassium cyanide (KCN), potassium formate (KHCOO), potassium hydrogen fluoride ($KHF_2$), potassium tetraiodomercurate (II) ($K_2[HgI_4]$), potassium hydrogen sulfide (KHS), potassium octachlorodimolybdate (II) ($K_4[Mo_2Cl_8]$), potassium amide ($KNH_2$), potassium hydroxide (KOH), potassium hexafluorophosphate ($KPF_6$), potassium carbonate ($K_2CO_3$), potassium tetrachloroplatinate (II) ($K_2[PtCl_4]$), potassium hexachloroplatinate (IV) ($K_2[PtCl_6]$), potassium nonahydridorhenate (VII) ($K_2[ReH_9]$), potassium sulfate ($K_2SO_4$), potassium acetate ($CH_3COOK$), gold (I) potassium cyanide ($K[Au(CN)_2]$), potassium hexanitrocobaltate (III) ($K_3[Co(NO_2)_6]$), potassium hexacyanoferrate (III) ($K_3[Fe(CN)_6]$), potassium hexacyanoferrate (II) ($K_4[Fe(CN)_6]$), potassium methoxide ($KOCH_3$), potassium ethoxide ($KOCH_2CH_3$), potassium tert-butoxide ($KOC(CH_3)_3$), potassium cyanate (KOCN), potassium fulminate (KONC), potassium thiocyanate (KSCN), potassium aluminum sulfate ($AlK(SO_4)_2$), potassium aluminate ($KAlO_2$), potassium arsenate ($K_3AsO_4$), potassium bromate ($KBrO_3$), potassium hypochlorite (KClO), potassium chlorite ($KClO_2$), potassium chlorate ($KClO_3$), potassium perchlorate ($KClO_4$), potassium carbonate ($K_2CO_3$), potassium chromate ($K_2CrO_4$), potassium dichromate ($K_2Cr_2O_7$), potassium tetrakis(peroxo)chromate (V) ($K_3Cr(O_2)_4$), potassium cuprate (III) ($KCuO_2$), potassium ferrate ($K_2FeO_4$), potassium iodate ($KIO_3$), potassium periodate ($KIO_4$), potassium permanganate ($KMnO_4$), potassium manganate ($K_2MnO_4$), potassium hypomanganate ($K_3MnO_4$), potassium molybdate ($K_2MoO_4$), potassium nitrite ($KNO_2$), potassium nitrate ($KNO_3$), tripotassium phosphate ($K_3PO_4$), potassium perrhenate ($KReO_4$), potassium selenate ($K_2SeO_4$), potassium silicate ($K_2SiO_3$), potassium sulfite ($K_2SO_3$), potassium sulfate ($K_2SO_4$), potassium thiosulfate ($K_2S_2O_3$), potassium disulfite ($K_2S_2O_5$), potassium dithionate ($K_2S_2O_6$), potassium disulfate ($K_2S_2O_7$), potassium peroxodisulfate ($K_2S_2O_8$), potassium dihydrogen arsenate ($KH_2AsO_4$), dipotassium hydrogen arsenate ($K_2HAsO_4$), potassium hydrogen carbonate ($KHCO_3$), potassium dihydrogen phosphate ($KH_2PO_4$), dipotassium hydrogen phosphate ($K_2HPO_4$), potassium hydrogen selenate ($KHSeO_4$), potassium hydrogen sulfite ($KHSO_3$), potassium hydrogen sulfate ($KHSO_4$), and potassium hydrogen peroxosulfate ($KHSO_5$).

Barium sulfite ($BaSO_3$), barium chloride ($BaCl_2$), barium chlorate ($Ba(ClO_3)_2$), barium perchlorate ($Ba(ClO_4)_2$), barium peroxide ($BaO_2$), barium chromate ($BaCrO_4$), barium acetate ($C_4H_6O_4Ba$), barium cyanide ($Ba(CN)_2$), barium bromide ($BaBr_2$), barium oxalate ($BaC_2O_4$), barium nitrate ($BaN_2O_6$), barium hydroxide ($Ba(OH)_2$), barium hydride ($H_2Ba$), barium carbonate ($BaCO_3$), barium iodide ($BaI_2$), barium sulfide (BaS), and barium sulfate ($BaSO_4$).

Metal oxides such as sodium oxide ($Na_2O$), calcium oxide (CaO), lithium oxide ($Li_2O$), boron oxide ($B_2O_3$), potassium oxide ($K_2O$), barium oxide (BaO), silicon oxide ($SiO_2$), titanium oxide ($TiO_2$), zirconium oxide ($ZrO_2$), aluminum oxide ($Al_2O_3$), zinc oxide (ZnO), and magnesium oxide (MgO).

Metal Salt

The metal salt is a raw material of the underlying metal and is only required to be a starting material capable of generating the underlying metal region 11. Examples of the metal salt include nitrates and carboxylates, and nitrates are preferably used. The metal in the metal salt is not particularly limited but can be appropriately selected according to the metal material described above. The metal salt may be one kind of a metal salt or a mixture of two or more kinds of metal salts. The metal salt may be solvated, that is, hydrated.

When the underlying metal is silver, a silver salt is used as the metal salt. As the silver salt, for example, silver nitrate, silver azide, disilver monofluoride, silver monoxide, silver chloride, silver chlorate, silver perchlorate, silver chromate, silver acetate, silver oxide, silver cyanide, silver cyanate, silver bromide, silver bromate, silver hydroxide, silver carbonate, silver thiocyanate, silver tetrafluoroborate, silver trifluoromethanesulfonate, silver fluoride, silver iodide, silver iodate, silver sulfide, silver sulfate, and silver phosphate are suitable. In addition, silver nanoparticles can also be used in place of the silver salt.

Organic Polymer

The organic polymer is used to increase the viscosity of the raw material composition to form a paste. Examples of the organic polymer include acrylic (homopolymer or copolymer of acrylic acid, methacrylic acid, or an ester thereof, specifically, an acrylic acid ester copolymer, a methacrylic acid ester copolymer, an acrylic acid ester-methacrylic acid ester copolymer, and the like), polyvinyl acetal-based (specifically, polyvinyl acetal, polyvinyl butyral, and the like), cellulose-based (specifically, hydroxypropyl cellulose, cellulose ether, carboxymethyl cellulose, acetyl cellulose, acetyl nitrocellulose, and the like), polyvinyl alcohol-based, polyvinyl acetate-based, polyvinyl chloride, polypropylene carbonate-based, and polyvinyl pyrrolidone homopolymers or copolymers, and at least one selected from these is contained.

Solvent

The solvent is preferably an alcohol-based solvent (specifically, ethanol vapor pressure: 5.9 kPa, 2-propanol: 4.3 kPa, 1-butanol: 0.6 kPa, and the like) or a glycol ether-based solvent (specifically, propylene glycol dimethyl ether: 7.6 kPa, ethylene glycol dimethyl ether: 6.4 kPa, propylene glycol monomethyl ether: 0.89 kPa, ethylene glycol monomethyl ether: 0.83 kPa, diethylene glycol monomethyl ether: 0.83 kPa, ethylene glycol monomethyl ether: 0.83 kPa, 2-methoxyethanol: 0.82 kPa, ethylene glycol monoethyl ether: 0.5 kPa, ethylene glycol monomethyl ether acetate: 0.27 kPa, and the like). These solvents have vapor pressures at room temperature of 0.1 kPa or more, and solvents having vapor pressures of 0.5 kPa or more are particularly preferable. These solvents have higher vapor pressures than other common solvents used for pastes. Incidentally, the solvents described in Patent Document 1 are butyl carbitol acetate 0.0053 kPa and ethyl carbitol 0.013 Pa. Therefore, by using such a solvent, a raw material composition in which a polymer is in an uneven state is obtained. This is because the solvent is likely to volatilize, and thus the fluidity is quickly impaired in the interval between coating and drying. When the paste is too easily dried, the life of the paste is shortened, and therefore a solvent having a vapor pressure of less than 0.1 kPa may be appropriately mixed in consideration of productivity. When this raw material composition is applied to a predetermined region of the ceramic body 1 and dried as described later, a coating film in which the polymer is dispersed in an uneven state can be obtained. When this coating film is subjected to a heat treatment, the unevenly dispersed organic polymer is gasified, and then the glass is melted, whereby the base layer 6 having pores penetrating from the front surface to the back surface can be formed.

Other Components (Reactant and Additive)

The raw material composition can contain any suitable reactants, additives, and the like in addition to the glass raw material (and optionally additives for glass), the metal salt, and the solvent. Examples of the reactant for obtaining a compound having a structure represented by the formula —O—M—O— (M is a metal atom) as a main skeleton by reacting a metal alkoxide include water and a hydroxy group-containing compound capable of substituting an alkoxy group of the metal alkoxide with a hydroxy group. Examples of the additive include a catalyst that promotes such a reaction, a viscosity modifier, a pH modifier, and a stabilizer.

Next, such a raw material composition is applied to a predetermined region of the ceramic body 1 and appropriately dried to form a coating film derived from the raw material composition. The coating method is not particularly limited, and immersion, spraying, screen printing, brushing, inkjet printing, or the like can be used. Drying is performed such that most, preferably substantially all, of the solvent in the raw material composition is removed. More specifically, the drying can be performed by heating the ceramic body applied with the raw material composition, for example, at 25 to 200° C. for 5 to 60 minutes.

Next, the ceramic body with the coating film is subjected to a heat treatment to obtain the base layer 6 derived from the coating film. The temperature and time of the heat treatment can be, for example, 300° C. or higher and 900° C. or lower and, for example, 10 to 60 minutes.

In particular, the temperature of the heat treatment is preferably 300° C. or higher and lower than 835° C., so that the underlying metal/glass ratio in the base layer 6 can be increased in the portion A on the front surface 6a side and decreased in the portion B on the back surface 6b side. The temperature of the heat treatment is more preferably 300° C. or higher and 800° C. or lower, so that the underlying metal/glass ratio in the portion A on the front surface 6a side of the base layer 6 can be 50% or more. The temperature of the heat treatment is particularly preferably 400° C. or higher and 750° C. or lower.

During this heat treatment (if applicable, during the drying treatment and the heat treatment), the raw material composition gelates to form the base layer 6 as a sol-gel fired film. More specifically, as a result of the heat treatment, a glass matrix (glass region 13) is formed from the precursor of glass, and the underlying metal region 11 is formed from a metal material formed from the metal salt.

The base layer 6 formed by the sol-gel method as described above has the pores P communicating from the front surface to the back surface (interface with the ceramic body 1). Further, the base layer 6 is sufficiently thinner than a base layer formed using a conventional conductive paste, and a thin base layer 6 having a thickness of, for example, 0.1 μm to 2 μm can be formed.

In addition, by using such a sol-gel method, it is possible to form the base layer 6 in which the underlying metal/glass ratio in the portion A of the base layer 6 closer to the metal layer 8 is higher than the underlying metal/glass ratio in the portion B of the base layer 6 closer to the ceramic body 1 (see FIG. 2). Therefore, when the metal layer 8 is formed by electrolytic plating, the metal film 8 (plating layer) having a sufficient density and thickness can be formed on the front surface 6a of the base layer 6.

3) Formation of Metal Layer 8

Next, the metal layer 8 is formed on the base layer 6 obtained as described above.

The metal layer 8 is preferably formed by electrolytic plating, so that the metal material can be present at a high density on the front surface 6a side of the base layer 6. In addition, since the plating solution can penetrate the whole pores P of the base layer 6, the plating layer can be formed inside the pores P. That is, the metal layer 8 can be formed on the surface of the base layer 6, and a part of the metal layer 8 can reach the back surface 6b (interface with the ceramic body 1) of the base layer 6 through the pores P. In addition, since the plating layer can be formed in most of the inside of the pores P, it is easy to set the void inside the base layer 6 to 1.5 vol % or less.

Electrolytic plating can be performed by immersing the ceramic body 1 on which the base layer 6 is formed in a plating solution (plating bath) and performing a plating treatment under predetermined conditions. The plating solution to be used and the conditions of the plating treatment can be appropriately selected according to the type of metal to be plated, the thickness of the plating film, and the like.

As described above, when the underlying metal/glass ratio in the portion A of the base layer 6 is higher than the underlying metal/glass ratio in the portion B, a plating layer having a sufficient density and thickness can be formed on the front surface 6a of the base layer 6 when electrolytic plating is performed, and the adhesion of the metal layer 8 can be improved.

With this, the electronic component 10 of the present embodiment is manufactured.

Although one embodiment of the present invention has been described above, the present invention is not limited to the embodiment, and various modifications can be made.

Example 1

In the following examples and comparative examples, a ceramic body for a multilayer inductor was used on the assumption that the electronic component was a multilayer inductor, but these results similarly apply to other electronic components.

Example 1

1) Preparation of Ceramic Body 41

Figure 4A:
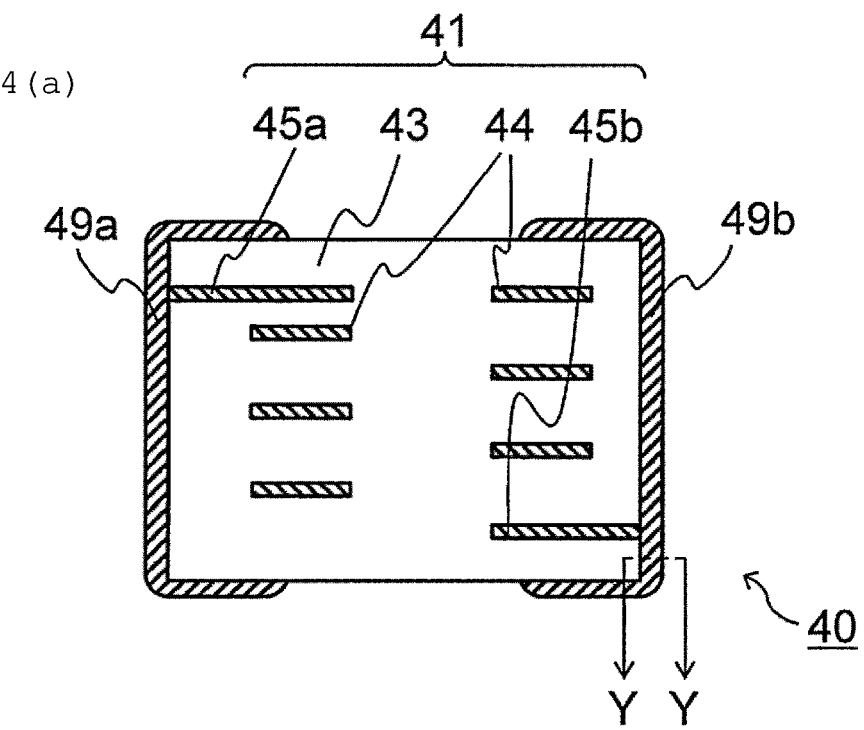
FIG. 4(a) is a schematic sectional view schematically illustrating an exemplary electronic component in Example 1 of the present invention.

First, a ceramic body 41 for a multilayer inductor 40 was prepared (see FIG. 4(a)). The ceramic body 41 included a ceramic portion 43 made of a ferrite material, a coil conductor 44 wound in a coil shape inside the ceramic portion 43, and extended parts (internal electrodes 45a and 45b) of the coil conductor 44. The dimensions of the ceramic body 41 were length=0.60 mm, width=0.30 mm, and height=0.30 mm.

2) Formation of Base Layer 46

A raw material composition (paste) was prepared by mixing raw materials (components) shown in "Example 1" in Table 1 in predetermined masses. The paste contained a Si alkoxide (TEOS: tetraethyl orthosilicate), a Ti alkoxide (TiBu: titanium butoxide), and a Zr alkoxide (ZrPr: zirconium propoxide) as precursors of glass. A 0.01N—HCl solution (0.01N aqueous hydrochloric acid solution) functions as an acid that is a catalyst and water for hydrolysis, and HPC functions as a viscosity modifier and a stabilizer.

Next, the raw material composition was applied to both ends (both end surfaces and parts of side surfaces located in the vicinity thereof) of the ceramic body 41 and dried at 150° C. for 30 minutes in an air atmosphere (normal pressure) to form a coating film derived from the raw material composition.

TABLE 1

| Raw material (component) | Example 1 Blending amount (g) | Other than Example 1 Blending amount (g) |
|---|---|---|
| 2-Methoxyethanol | 75.93 | 54.42 |
| Aluminum (III) acetylacetonate | 0.19 | 0.96 |
| Tetraethyl orthosilicate | 0.79 | 3.94 |
| Titanium (IV) butoxide | 0.12 | 0.61 |
| Zirconium propoxide solution, 70 wt % in 1-propanol | 0.11 | 0.54 |
| 0.01-N normal aqueous hydrochloric acid solution | 0.14 | 0.68 |
| Silver nitrate | 4.03 | 20.16 |
| Hydroxypropyl cellulose 2.0-2.9 | 18.69 | 18.69 |
| Total | 100.00 | 100.00 |

Figure 4B:
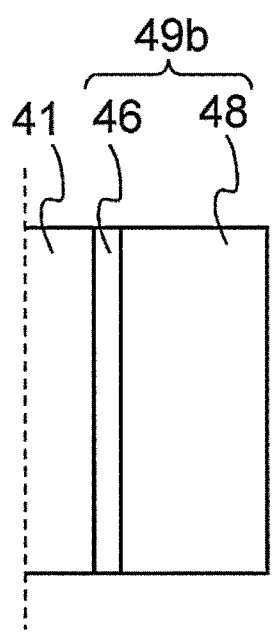
FIG. 4(b) is an enlarged schematic sectional view taken along the Y-Y plane of FIG. 4(a).

Thereafter, the ceramic body 41 with the coating film was subjected to a heat treatment at 635° C. for 30 minutes under an air atmosphere (normal pressure) to form a base layer 46 derived from the coating film (see FIG. 4(b)).

3) Formation of Metal Layer 48

The ceramic body 41 with the base layer 46 obtained was used to form a Ni metal layer as a metal layer 48 on the base layer 46 by electrolytic plating (see FIG. 4(b)).

As a result, a sample was obtained, in which external electrodes 49a and 49b formed of the base layer 46 and the metal layer 48 formed thereon were provided on the surface of the ceramic body 41. The external electrodes 49a and 49b covered both ends (both end surfaces and parts of side surfaces located in the vicinity thereof) of the ceramic body 41.

Evaluation

The sample obtained according to the present example was evaluated as follows.

A section of the sample of the present example (temperature of heat treatment: 635° C.) was inspected using a SEM apparatus. As confirmed using the obtained SEM image (FIG. 5), the thickness of the base layer 46 was 109 nm. The thickness of a base layer formed using a commercially available silver paste as the conductive paste was able to be about 10 μm, whereas the base layer 46 in the sample of the present example was able to be thinned to about 1/90 thereof.

Figure 5:
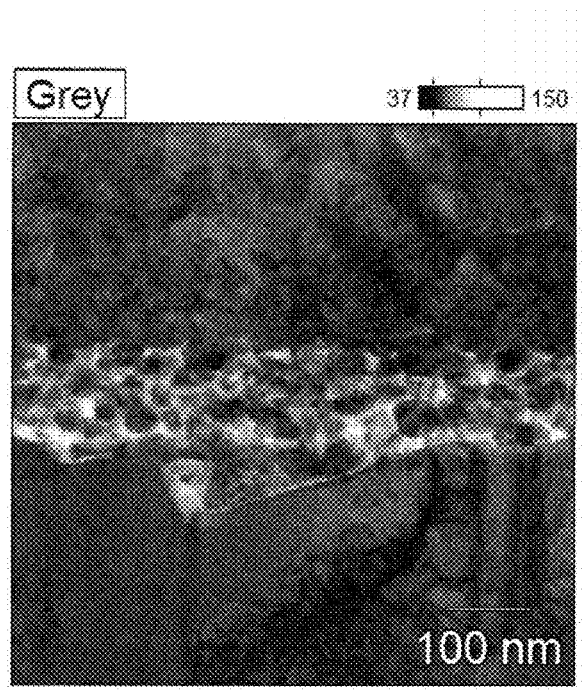
FIG. 5 is a STEM image of a section of a base layer in a sample produced in Example 1 of the present invention.

Using a TEM-EDX apparatus (FE-TEM/EDX (JEOL JEM-F200 (manufactured by JEOL Ltd.)/analysis system Noran system 7 (manufactured by Thermo Fisher Scientific))), the sample of the present example (temperature of heat treatment: 635° C.) was processed to expose a section of the base layer 46 in the thickness direction, and the exposed section was observed and analyzed. The obtained STEM image is shown in FIG. 5, and TEM-EDX images concerning Si, Ag and Ni are respectively shown in FIGS. 6 to 8. In FIGS. 5 to 8, the lower side is the internal electrodes 45a and 45b of the ceramic body 41, and the upper side is the Ni metal layer 48.

Figure 6:
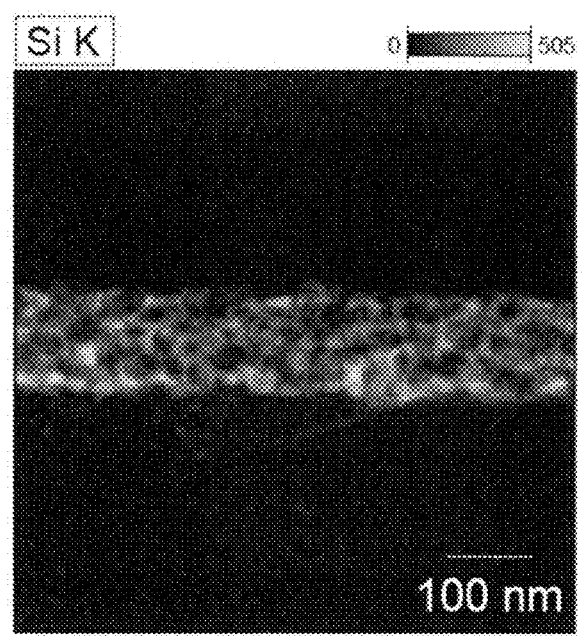
FIG. 6 shows a result of examining the distribution of Si by EDX analysis from a TEM image of the section of the base layer in the sample produced in Example 1 of the present invention.
Figure 7:
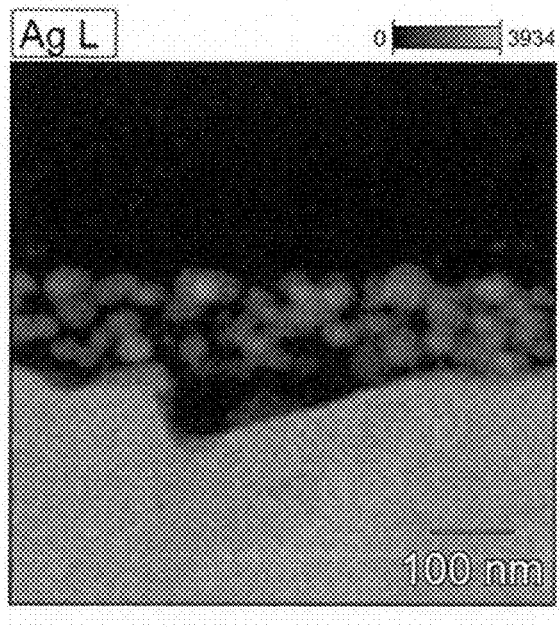
FIG. 7 shows a result of examining the distribution of Ag by EDX analysis from a TEM image of the section of the base layer in the sample produced in Example 1 of the present invention.

As understood from the TEM-EDX image (Si) of the base layer 46 shown in FIG. 6, the area of the glass region (Si) in the base layer 46 decreases from the ceramic body 41 side (internal electrode 45a and 45b side) toward the metal layer 48 side. Conversely, as understood from the TEM-EDX image (Ag) of the base layer 46 shown in FIG. 7, the area of the underlying metal region (Ag) increases from the ceramic body 41 side (internal electrode 45a and 45b side) toward the metal layer 48 side. Therefore, it was found that the underlying metal/glass ratio in a portion of the base layer 46 closer to the metal layer 48 was higher than the underlying metal/glass ratio in a portion of the base layer 46 closer to the ceramic body 41 (internal electrodes 45a and 45b).

Although both the internal electrodes 45a and 45b and the underlying metal region were formed of Ag, their interface could be clearly distinguished using EDX of glass (Si).

Figure 8:
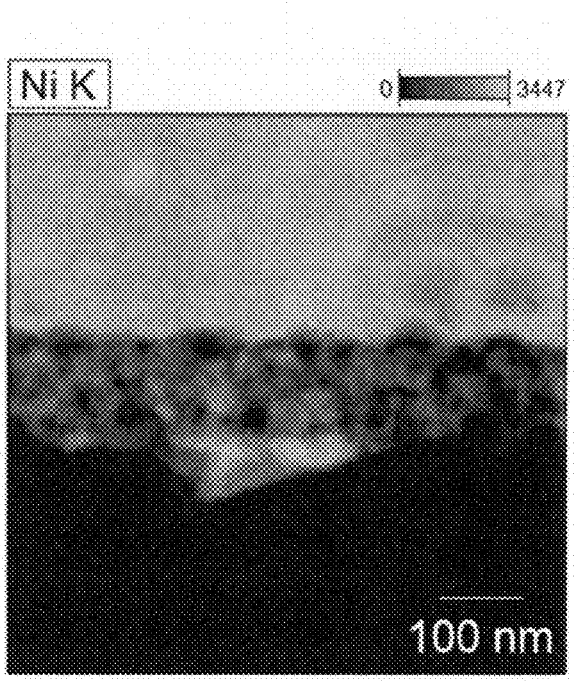
FIG. 8 shows a result of examining the distribution of Ni by EDX analysis from a TEM image of the section of the base layer in the sample produced in Example 1 of the present invention.
Figure 9:
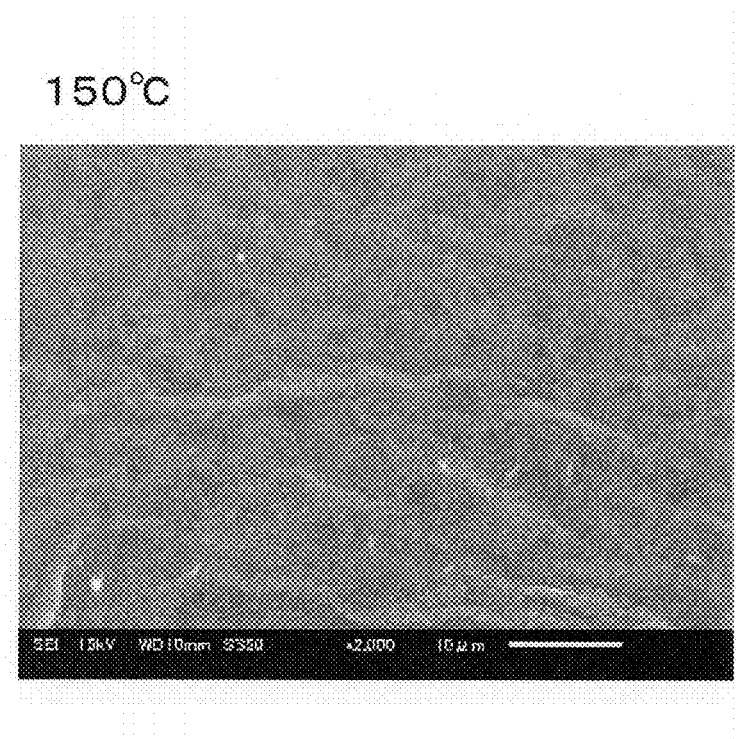
FIG. 9 is a SEM image of an exposed surface (before plating treatment) of a base layer formed in Comparative Example 1 of the present invention.
Figure 10:
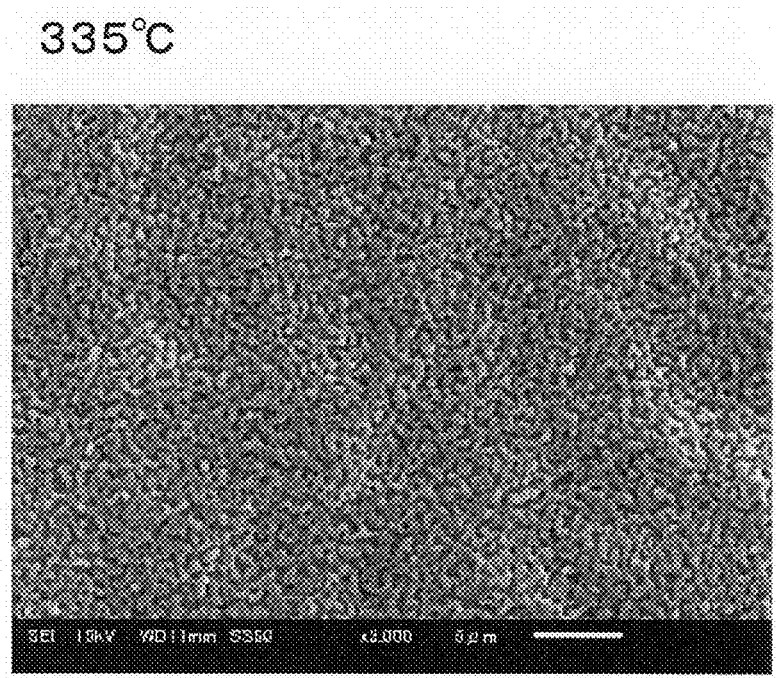
FIG. 10 is a SEM image of an exposed surface (before plating treatment) of a base layer formed in Example 2 of the present invention.
Figure 11:
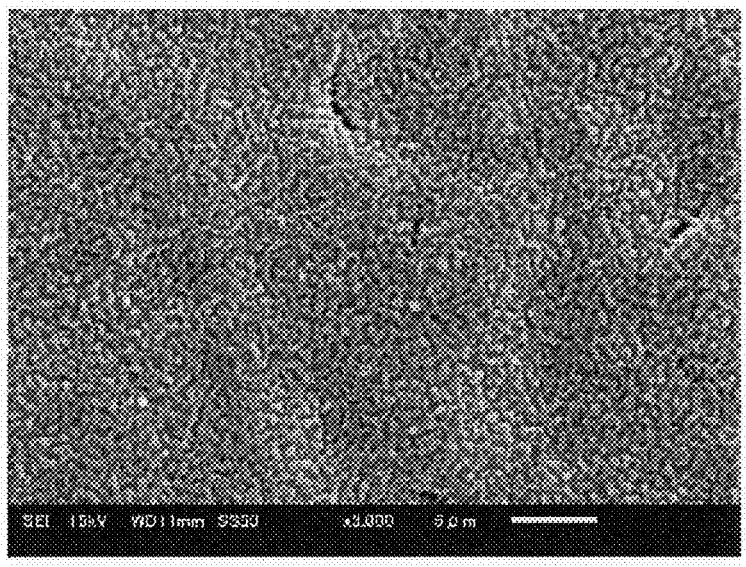
FIG. 11 is a SEM image of an exposed surface (before plating treatment) of a base layer formed in Example 3 of the present invention.
Figure 12:
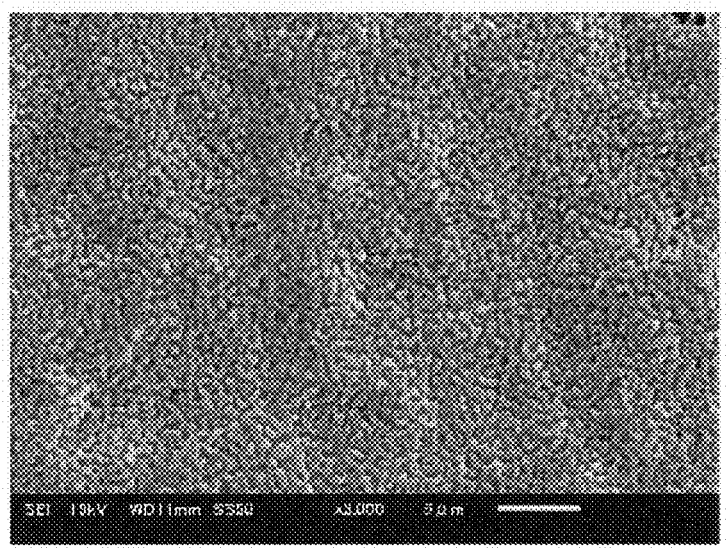
FIG. 12 is a SEM image of an exposed surface (before plating treatment) of a base layer formed in Example 4 of the present invention.
Figure 13:
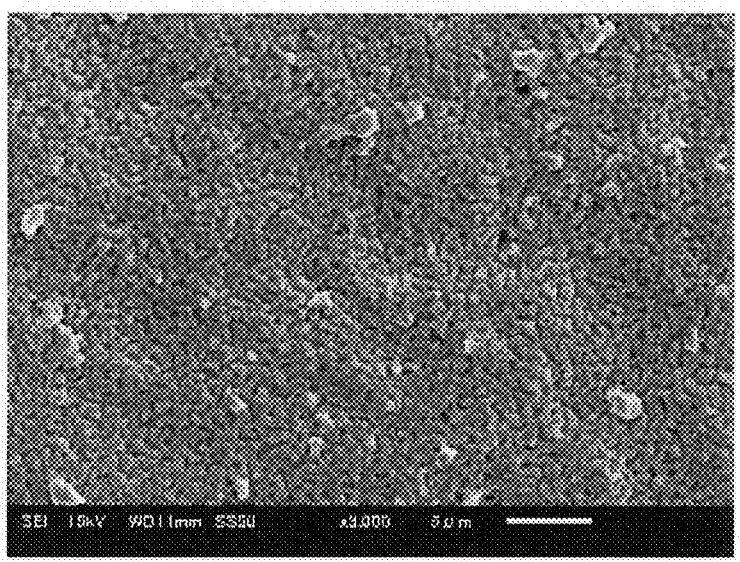
FIG. 13 is a SEM image of an exposed surface (before plating treatment) of a base layer formed in Example 5 of the present invention.
Figure 14:
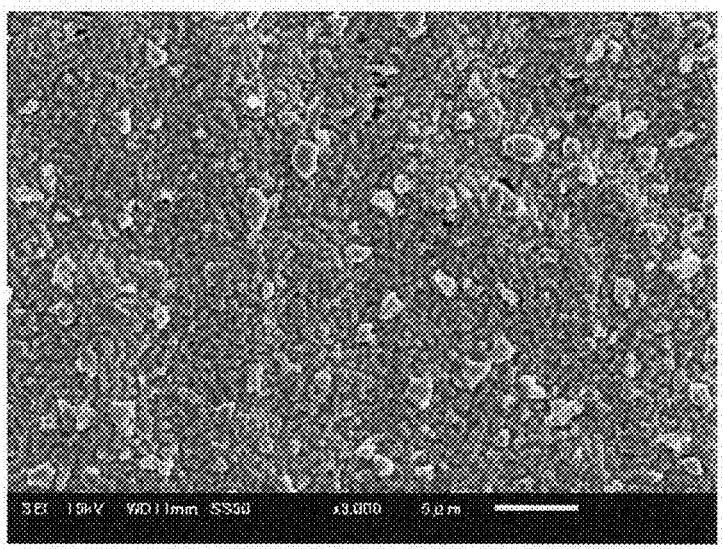
FIG. 14 is a SEM image of an exposed surface (before plating treatment) of a base layer formed in Example 6 of the present invention.
Figure 15:
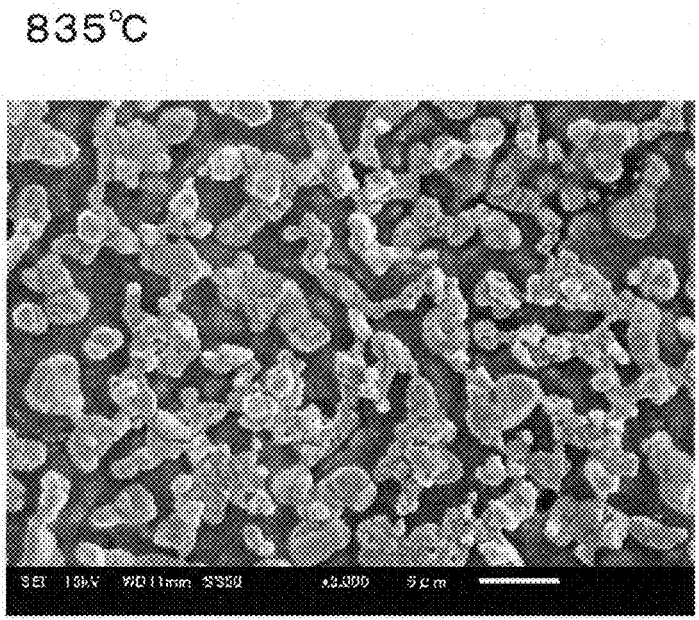
FIG. 15 is a SEM image of an exposed surface (before plating treatment) of a base layer formed in Comparative Example 2 of the present invention.

From the TEM-EDX image (Ni) of the base layer shown in FIG. 8, it was confirmed that the Ni metal layer 48 was formed on the surface of the base layer 46, and a part of the metal layer 48 extended through the inside of the base layer 46 to reach the interface between the base layer 46 and the ceramic body 41. Since the Ni metal layer spreading inside the base layer 46 spread so as to fill the portion where the pores of the base layer 46 existed, it can be seen that the base layer 46 had pores before the Ni metal layer 48 was formed. In addition, since the Ni metal layer 48 reached the interface between the base layer 46 and the ceramic body 41 from the surface of the base layer 46 (interface with the metal layer), it can also be seen that the pores of the base layer 46 communicated from the surface of the base layer 46 to the interface with the ceramic body 41.

It can be said that since a part of the Ni metal layer 48 reached the interface with the ceramic body 41 from the inside of the pores of the base layer 46, the Ni metal layer 48 and the base layer 46 are firmly bonded, and the Ni metal layer 48 is not easily peeled off from the base layer 46 (the bonding strength between the metal layer 48 and the base layer 46 is high).

Examples 2 to 6 and Comparative Examples 1 and 2

A base layer 46 was formed on the surface of the ceramic body 41 to obtain a sample (Examples 2 to 6 and Comparative Examples 1 and 2) in the same manner as in Example 1 except that the raw material composition was prepared according to "Other than Example 1" in Table 1 and that the temperature of the heat treatment was set to the temperature shown in Table 2. FIG. 9 to FIG. 15 illustrate SEM images of the exposed surfaces of the base layers 46 obtained by a heat treatment at respective treatment temperatures.

For the samples obtained according to Examples 2 to 6 and Comparative Examples 1 and 2, the film thickness and electric resistance of the base layer 46 were measured. Further, the Ni metal layer 48 was formed on the surface of the base layer 46 of each sample by electrolytic plating, and the moldability of electrolytic plating, the state of the metal layer 48 (whether a part of the metal layer 48 reached the back surface of the base layer 46), and the void ratio of the base layer 46 were examined. The results are shown in Table 2. In Table 2, "-" means "not measured".

The prepared paste was applied onto a ceramic substrate by spin coating or the like, firing was performed, and the electric resistance of the sample was measured at a distance of 0.5 mm between terminals using a digital multimeter. As the void decreased, the electrical resistance decreased.

In the "Formation of electrolytic plating", it was evaluated whether the Ni metal layer 48 could be formed on the surface of the base layer 46 by electrolytic plating. "o" in the table indicates that plating was possible. Also when the electric resistance of the sample was low, at a heating temperature of 150° C., the resin added for adjusting the viscosity and imparting stability remained, and adhesion between the base layer 46 and the Ni metal layer 48 could not be secured, so that peeling occurred due to the tensile stress of plating. "x" in the table indicates that plating could not be performed because resistance could not be secured.

The state of the metal layer 48 (whether a part of the metal layer 48 reached the back surface of the base layer) was specified by forming the Ni metal layer 48 on the surface of the base layer 46, then processing the product to expose a section of the base layer 46 in the thickness direction, and inspecting a STEM image and a TEM-EDX image of the exposed section, as in Example 1.

After the Ni metal layer 48 was formed on the surface of the base layer 46, the void ratio of the base layer 46 was determined. The void ratio was determined by the method described above. The elements for which EDX analysis was performed were oxygen (O), aluminum (Al), silicon (Si), titanium (Ti), iron (Fe), nickel (Ni), zinc (Zn), zirconium (Zr), silver (Ag), and tin (Sn).

The adhesion between the base layer and the metal layer was evaluated as follows. A Ni metal layer 48 was formed on the surface of the base layer 46. Thereafter, the surface of the metal layer 48 was bonded to a surface of a test substrate with an adhesive using the surface of the metal layer 48 as a bonding surface. Next, the sample was pressed in a direction parallel to the surface of the test substrate (that is, shearing force is applied), and the pressing force (shearing force) when the metal layer 48 was peeled from the base layer 46 was determined to check the peel strength (N). A sample having a peel strength of 5 N or less was rated as NG (x), and a sample having a peel strength of 5 N or more was rated as G (o).

TABLE 2

|  | Comparative Example 1 150° C. | Example 2 335° C. | Example 3 435° C. | Example 4 535° C. | Example 5 635° C. | Example 6 735° C. | Comparative Example 2 835° C. |
| --- | --- | --- | --- | --- | --- | --- | --- |
| Temperature of heat treatment | 4.65 | 1.58 | 1.59 | 1.29 | 1.03 | 0.90 | 0.85 |
| Film thickness [μm] | 2.7Ω | 0.9Ω | 0.9Ω | 0.7Ω | 0.5Ω | 0.33Ω | 0.L |
| Electric resistance | Peeling during plating | ○ | ○ | ○ | ○ | ○ | X |

TABLE 2-continued

|  | Comparative Example 1 150° C. | Example 2 335° C. | Example 3 435° C. | Example 4 535° C. | Example 5 635° C. | Example 6 735° C. | Comparative Example 2 835° C. |
|---|---|---|---|---|---|---|---|
| Formation of electrolytic plating | X | ○ | ○ | ○ | ○ | ○ | X |
| Whether part of metal layer reaches back surface of base layer | — | 1.20% | 0.60% | 0.50% | 0.10% | 0.00% | — |
| Void ratio of base layer | — | ○ | ○ | ○ | ○ | ○ | — |

The results in Table 2 are discussed.

In Examples 2 to 6, since the heating temperature was appropriate, a part of the metal layer 48 reached the back surface of the base layer 46, and thus adhesion between the base layer 46 and the metal layer 48 was good. On the other hand, in Comparative Examples 1 and 2, since the heating temperature was not appropriate, the metal layer 48 did not reach the back surface of the base layer 46, and the adhesion between the base layer 46 and the metal layer 48 was insufficient.

(Example 7 and Comparative Example 3

Figure 16:
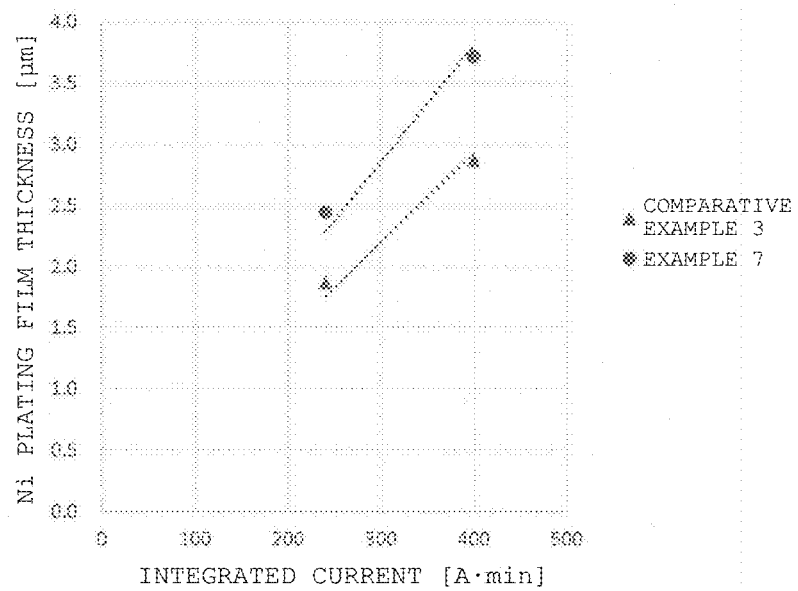
FIG. 16 is a graph showing the Ni plating film thickness with respect to the integrated current in Example 7 and Comparative Example 3 of the present invention.

In Example 7, a Ni plating film (Ni metal layer 48) was formed by performing Ni plating under the conditions shown in FIG. 16 using the sample after baking the base layer 46 in Example 1. The relationship between the integrated current at that time and the film thickness of the Ni metal layer 48 was evaluated. In Comparative Example 3, Ni plating was performed on a base electrode formed using a general silver paste (Ag particles: 73 wt %, glass frit ($ZnO$—$B_2O_3$—$SiO_2$): 4 wt %, ethyl cellulose: 10 wt %, and 1:1 mixed solution of butyl carbitol acetate and ethyl carbitol: 13 wt %). As can be seen from FIG. 16, also at the same integrated current, the film thickness of the Ni plating film (Ni metal layer 48) in Example 7 was larger than the film thickness of the plating film in Comparative Example 3. From this, it was found that the underlying metal/glass ratio was large in Example 7.

DESCRIPTION OF REFERENCE SYMBOLS

1, 41: Ceramic body
3, 43: Ceramic portion
5a, 5b, 45a, 45b: Internal electrode
6, 46: Base layer
8, 48: Metal layer
9, 9a, 9b, 49a, 49b: External electrode
10: Electronic component (multilayer ceramic capacitor)
11: Underlying metal region
13: Glass region
40: Electronic component (multilayer inductor)
44: Coil conductor

The invention claimed is:

1. An electronic component comprising:
 a ceramic body and
 an external electrode on a surface of the ceramic body, wherein the external electrode includes:
  a base layer in contact with the surface of the ceramic body; and
  a metal layer on a surface of the base layer,
 the base layer having a pore communicating from the surface of the base layer that is in contact with the metal layer to an interface with the surface of the ceramic body,
 a part of the metal layer extends to the interface with the surface of the ceramic body through the pore, and
 a void ratio in the base layer is 1.5 vol % or less.

2. The electronic component according to claim 1, wherein the base layer has a thickness of 0.1 μm to 2 μm.

3. The electronic component according to claim 1, wherein
 the base layer includes an underlying metal and glass, and
 a first volume ratio of the underlying metal to the glass in a first portion of the base layer closer to the metal layer is higher than a second volume ratio of the underlying metal to the glass in a second portion of the base layer closer to the ceramic body.

4. The electronic component according to claim 3, wherein
 the underlying metal is silver,
 the glass contains silicon atoms, titanium atoms, and zirconium atoms, and
 the metal layer contains one or more selected from the group consisting of nickel, copper, and tin.

5. The electronic component according to claim 3, wherein a thickness of the first portion of the base layer closer to the metal layer is 50% or less of a thickness of the base layer.

6. The electronic component according to claim 5, wherein a thickness of the second portion of the base layer closer to the ceramic body is equal to the thickness of the first portion of the base layer closer to the metal layer.

7. The electronic component according to claim 6, wherein the thickness of the first portion of the base layer closer to the metal layer is 30% of the thickness of the base layer.

8. An electronic component according to claim 3, comprising:
 a ceramic body and
 an external electrode on a surface of the ceramic body, wherein the external electrode includes:
  a base layer in contact with the surface of the ceramic body; and
  a metal layer on a surface of the base layer,
 the base layer having a pore communicating from the surface of the base layer to an interface with the surface of the ceramic body,
 a part of the metal layer extends to the interface with the surface of the ceramic body through the pore, and
 a void ratio in the base layer is 1.5 vol % or less, the base layer includes an underlying metal and glass,
a first volume ratio of the underlying metal to the glass in a first portion of the base layer closer to the metal layer is higher than a second volume ratio of the underlying metal to the glass in a second portion of the base layer closer to the ceramic body, and
wherein the first volume ratio in the first portion of the base layer closer to the metal layer is 50% or more.

9. An electronic component comprising:
a ceramic body and
an external electrode on a surface of the ceramic body, wherein the external electrode includes:
  a base layer in contact with the surface of the ceramic body; and
  a metal layer on a surface of the base layer,
the base layer having a pore communicating from the surface of the base layer to an interface with the surface of the ceramic body,
a part of the metal layer extends to the interface with the surface of the ceramic body through the pore, and
a void ratio in the base layer is 1.5 vol % or less,
the base layer includes an underlying metal and glass,
a first volume ratio of the underlying metal to the glass in a first portion of the base layer closer to the metal layer is higher than a second volume ratio of the underlying metal to the glass in a second portion of the base layer closer to the ceramic body,
the base layer includes underlying metal regions containing the underlying metal and glass regions containing the glass, and
at least two of the underlying metal regions and at least two of the glass regions are alternately arranged on a straight line drawn along a thickness direction of the base layer in a sectional view of the electronic component.

* * * * *